United States Patent [19]

McNaughton

[11] Patent Number: 4,904,919
[45] Date of Patent: Feb. 27, 1990

[54] DUAL MODE CONTROL OF A PWM MOTOR DRIVE FOR CURRENT LIMITING

[75] Inventor: Larry S. McNaughton, Mequon, Wis.

[73] Assignee: Allen-Bradley Company, Inc., Milwaukee, Wis.

[21] Appl. No.: 209,681

[22] Filed: Jun. 21, 1988

[51] Int. Cl.$^4$ .............................................. H02P 5/40
[52] U.S. Cl. .................................. 318/798; 318/806; 318/811
[58] Field of Search ............... 318/811, 798, 806, 803, 318/807–810; 363/41, 42

[56] References Cited

U.S. PATENT DOCUMENTS

| | | | |
|---|---|---|---|
| 3,819,992 | 6/1974 | Opal et al. | 318/171 |
| 4,047,083 | 9/1977 | Plunkett | 318/231 |
| 4,327,315 | 4/1982 | Kawada et al. | 318/811 |
| 4,333,042 | 6/1982 | Kawada et al. | 318/811 |
| 4,364,109 | 12/1982 | Okado et al. | 318/811 |
| 4,458,192 | 7/1984 | Sakamoto et al. | 318/798 |
| 4,481,457 | 11/1984 | Zach et al. | 318/811 |
| 4,486,824 | 12/1984 | Okuyama et al. | 363/41 |
| 4,546,422 | 10/1985 | Okado | 318/811 |
| 4,628,475 | 12/1986 | Azusawa et al. | 364/851 |
| 4,646,221 | 2/1987 | Sekino et al. | 363/41 |
| 4,672,521 | 6/1987 | Riesco | 363/41 |

FOREIGN PATENT DOCUMENTS 91897 5/1985 Japan ................................... 318/811

Primary Examiner—David Smith, Jr.
Attorney, Agent, or Firm—Quarles & Brady

[57] ABSTRACT

A method and circuit for application in a PMW inverter for controlling power to an AC motor in which a hysteresis modulator is employed as a current limiter to override sine-triangle modulation in a PWM generator circuit. When the magnitude of motor current reaches a hysteresis band upper limit, the hysteresis modulator generates a large limit current to a summing input on a current regulator which feeds the PWM generator to override and mask out the normal sine-triangle modulated signal. When the magnitude of motor current decreases to a hysteresis band lower limit, the limit current is terminated, and the sine-triangle modulation is resumed.

12 Claims, 5 Drawing Sheets

STATOR CURRENT (ONE PHASE) VS. TIME

DUAL MODE CONTROL OF A PWM MOTOR DRIVE FOR CURRENT LIMITING

BACKGROUND OF THE INVENTION

1. Technical Field

The invention generally relates to motor control systems for controlling the operation of AC motors.

2. Description of the Background Art

A typical three-phase AC motor control system includes a power circuit and a control circuit. The power circuit usually includes an AC-to-DC converter, an intermediate DC circuit and an inverter for reconverting DC power to alternating currents that are supplied to the stator of the motor. The inverter includes network of at least six semiconductor switches, which may be thyristors or power transistors. The phase currents in the stator of the motor may be precisely controlled by controlling the firing or conduction of the semiconductor switches with one of several known control circuits. One type of control circuit uses a pulse width modulation (PWM) to control the operation of the semiconductor switches.

A typical three-phase PWM motor drive generates a pulse width modulated (PWM) signal to the power semiconductors in a DC-to-AC inverter. The PWM generator circuit is often operated in a sine-triangle mode in which a time-varying sinusoidal command signal is compared with a triangular waveform and in which the crossing points of the two waveforms define the rising and falling edges of the pulses generated in the resulting PWM pulse train.

Another known type of modulating circuit used in motor control is referred to as a hysteresis modulator. With this type of modulator a command signal is compared to an upper reference and a lower reference to limit the resulting signal within a hysteresis band having an upper limit and a lower limit.

The following is a summary of background patents which are cited to show examples of techniques used in the art of PWM motor drives.

Sakamoto et al, U.S. Pat. No. 4,458,192, FIG. 2, provides one example of current limiting circuitry in a 3-phase PWM drive. The object of this current limiting is to prevent saturation of the current amplifiers when the 3-phase currents are unbalanced.

Okado et al., No. 4,364,109 shows a PWM inverter which is controlled in the hysteresis mode and in the sine-triangle mode. In this patent the circuitry for the two modes is connected in parallel, and the switching between the two modes is based on frequency range rather than on magnitude.

Opal et al., U.S. Pat. No. 3,819,992 et al, FIG. 1, shows a current limiting circuit for controlling an input to a PWM modulator to provide both upper and lower voltage limits from being exceeded, however, the response is again based on frequency rather than on magnitude of current.

Plunket, U.S. Pat. No. 4,047,083 shows a PWM drive that operates in the traditional sine-triangle mode and in a second mode.

Riesco, No. 4,672,521, shows a hysteresis-type circuit for limiting the magnitude of a sine wave reference signal within a certain band (see FIG. 5). Okuyama, No. 4,486,824 shows a hysteresis-type PWM inverter in FIG. 5.

Sekino et al., No. 4,646,221, and Azusawa et al., No. 4,628,475 show sine-triangle PWM inverter circuits.

Sine-triangle modulators are known to run at a frequency that is limited and controlled by the triangle wave generator which normally prevents the system from migrating to system resonant frequencies and causing instability in closed loop systems. Also, current ripple and torque disturbances are normally low in the steady-state as compared to other techniques.

A technical problem may arise, however, in closed loop PWM motor drive systems during transient conditions which cause large undesirable instantaneous values for current in the PWM-generated wave. This may limit the reliability or range of operation of the motor drive. One such transient condition may occur when power is interrupted and then reapplied to a motor that is still rotating. Under this condition transient currents may become too great in a sine-triangle PWM modulating circuit.

SUMMARY OF THE INVENTION

The invention involves a method and a control circuit for switching between sine-triangle modulation and hysteresis modulation in a PWM drive to overcome the problems discussed above.

The invention recognizes that a principal advantage of hysteresis modulation is that current magnitude is precisely controlled and the magnitude of current ripple riding the resultant AC waveform can also be held constant. The invention overcomes the disadvantage of hysteresis modulation, i.e. that the frequency of the current ripple is uncontrolled, by limiting application of the hysteresis modulator to certain transient conditions and switching back to sine-triangle modulation as soon as the transient conditions have subsided.

Although techniques have been known for controlling and limiting frequency in hysteresis modulators, it has not been known to combine the two types of modulators in a PWM drive as shall be described and claimed herein.

In one method of the invention a phase current is supplied to an electrical motor as a result of pulse signals being generated by a pulse width modulating (PWM) generator to control power semiconductors in a DC-to-AC inverter. The method comprises the steps of (1) sensing the phase current being drawn by the electrical motor; (2) regulating the phase current being drawn by the electrical motor using a current feedback loop; (3) producing sine-triangle pulse width modulation and generating a phase voltage command as an output of the PWM generator; and (4) overriding the sine-triangle pulse width modulation with hysteresis modulation in which the phase voltage command is controlled in response to the magnitude of the sensed phase current reaching a hysteresis band upper limit. At a later time, there is a reversion to sine-triangle modulation in response to the magnitude of the sensed phase current decreasing to a hysteresis band lower limit.

One embodiment of the circuit of the invention comprises: (1) a pulse width modulating (PWM) generator; (2) a current regulator for providing a voltage command reference to the PWM generator; (3) a triangular wave generator for generating a triangular wave reference to the PWM generator; and (4) a hysteresis modulator connected to an input on the current regulator to generate a limit current that further generates a voltage reference from the current regulator to the PWM generator that renders ineffective sine-triangle pulse width modulation to limit the motor current to a hysteresis band upper limit. The hysteresis modulator is later responsive to the magnitude of the sensed phase current decreasing to a hysteresis band lower limit to allow re-establishment of sine-triangle modulation in PWM generator.

One general object of the invention is to precisely limit current in a motor drive under a greater range of operating conditions than was possible prior to the invention.

Another general object of the invention is to improve reliability of a motor drive.

Another general object of the invention is to allow maximum power utilization of the motor drive.

A specific object of the invention is to allow the starting of a motor drive into an already rotating motor over a broad range of speed and torque values within the ratings of of the motor.

These and other objects and advantages of the invention will be apparent from the following description, in which reference is made to the accompanying drawings, which form a part hereof, and in which there is shown by way of example a preferred embodiment of the invention. This example does not necessarily represent the full scope of the invention, however, and reference is therefore made to the claims for determining the various embodiments within the scope of the invention.

DETAILED DESCRIPTION OF THE PREFERRED EMBODIMENT

Figure 1:
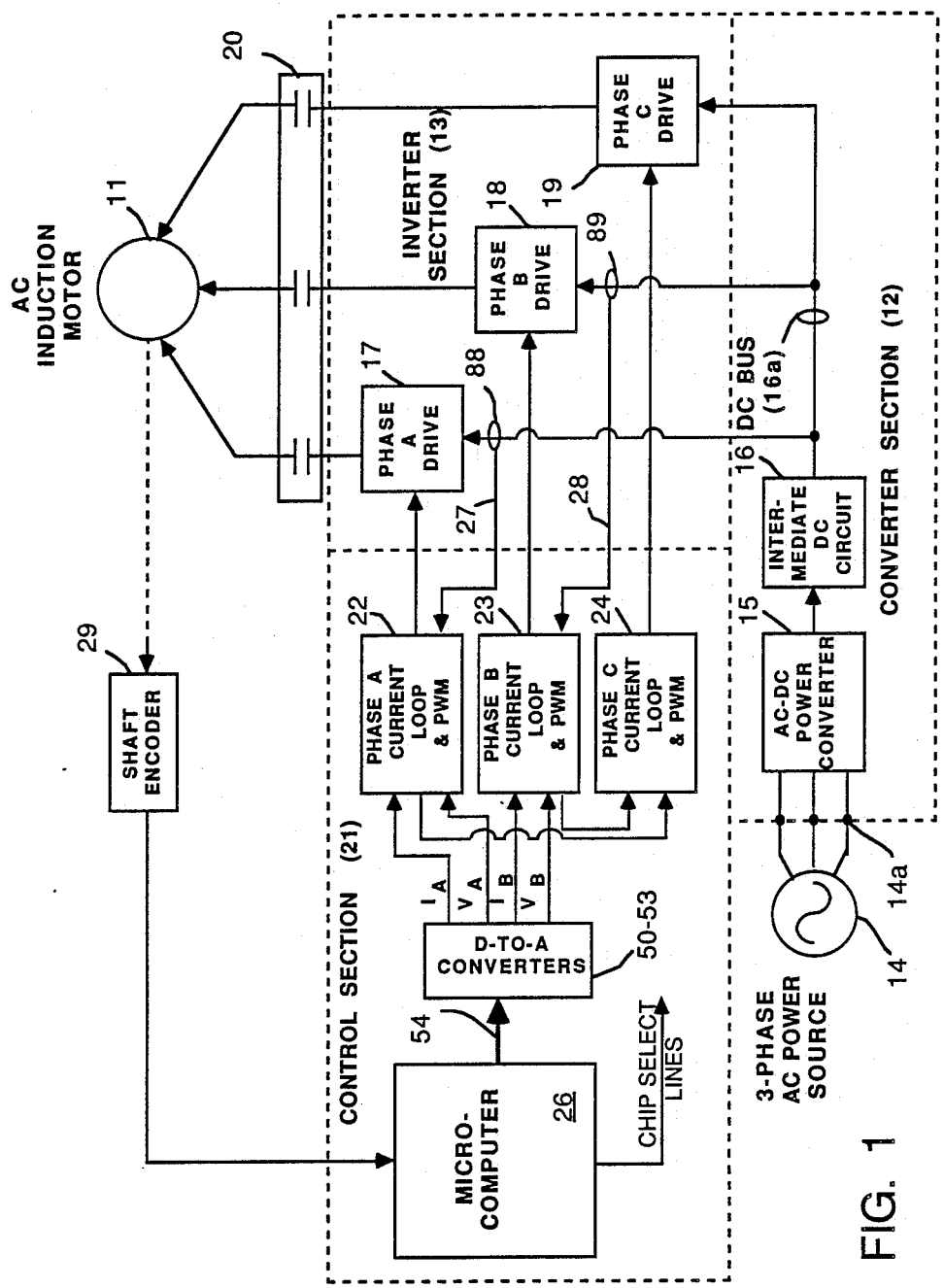
FIGS. 1 and 2 are block diagrams of a motor control system that incorporates the invention.

Referring to FIG. 1, the invention is practiced in a motor control system which is referred to in the art as a "motor drive". This particular motor control system is applied to controlling AC induction motors such as the 3-phase induction motor 11 illustrated in FIG. 1.

The drive 10 includes a converter section 12 and an inverter section 13 which convey power from a 3-phase, 60-hertz, AC voltage source 14 to the motor 11. The power source 14 is connected through power terminals 14a to an AC-to-DC power converter 15. The key component of such converters 15 is a 3-phase diode bridge rectifier, which rectifies the alternating current power line signals to provide direct current power signals for each of the three respective phases of the motor 11. The converter 15 may also include a set of power semiconductor switches connected in parallel with the diodes in the bridge for operation in a regeneration or braking mode when power is fed back to the power source 14.

An intermediate DC circuit 16 is connected to the outputs of the converter 15 to receive the DC signals. In the example described here the intermediate DC circuit is constructed with a large capacitor in a manner known in the art to act as relatively stiff (load-independent) DC voltage source. The DC voltage is fed through a DC bus 16a to Phase A, Phase B and Phase C drive circuits 17–19 in an inverter section 13, and there the DC voltages are converted back to AC signals that are fed to the stator of the motor 11 through an AC contactor 20 having three pairs of normally open contacts and a coil (not shown) suitable for operation at 60-hertz.

The Phase A, Phase B and Phase C drive circuits 17–19 include a set of six power semiconductors which are connected in a bridge network familiar to those skilled in the art. A set of diodes is provided in one-to-one parallel relationship with the semiconductors.

In converting DC signals to AC signals to be fed to the motor 11, the present drive system 10 utilizes pulse width modulation, which provides DC-to-AC power conversion for controlling the speed and torque of the motor 11. Pulse width modulation will be discussed further in connection with the control section 21 of the drive 10.

For further details regarding a suitable AC-to-DC power converter 14, intermediate DC circuit 16 and the power portions of the inverter section 13, reference is made to a U.S Patent of Fulton et al., No. 4,620,272, issued Oct. 28, 1986.

The control section 21 of the drive includes three pulse width modulation (PWM) modules 22–24 for controlling the current supplied to the motor 11 through the Phase A, Phase B and Phase C drive circuits 17–19. The PWM modules 22 and 23 receive analog signals such as phase current command ($I_A$, $I_B$) and phase voltage command ($V_A$, $V_B$) signals from a digital-to-analog converter circuits 50–53. The digital values for the current command signals ($I_A$, $I_B$) are resolved from a vector control parameter, which is calculated by the microcomputer 26. These digital values are then converted to analog signals by the digital-to-analog converters 50–53.

A current control loop is provided on each of the PWM modules 22 and 23 by algebraically summing current feedback signals received through lines 27 and 28 with the current command signals for Phase A and Phase B ($I_A$, $I_B$). As described in U.S. Pat. No. 4,306,182 entitled "Polyphase Motor Drive System With Balanced Modulation", the third PWM module 24 receives the inverted sum of the current error signals from the other two phases and develops voltage command signals for the Phase C drive circuit 19 that are in balance with the current error signals driving the phase A and Phase B drive circuits 17 and 18.

The microcomputer 26 executes a stored program to control the speed and torque of the motor 11 through the circuitry described above. The microcomputer 26 receives shaft position data from a shaft encoder 29 mounted on a rotor shaft of the motor 11. From this data, the microcomputer 26 can determine both the angular position of the rotor shaft and the angular velocity at which the shaft is rotating. To execute a velocity control loop, the microcomputer 26 also receives a commanded velocity from a user input device (not shown). The difference between the commanded velocity and the actual velocity is determined by the microcomputer 26 to produce a velocity error signal. The velocity error signal drives a torque command signal which in turn drives the current command signals ($I_A$, $I_B$) for the respective phases and this in turn drives the motor to the commanded speed and torque. For details of the microcomputer 26, reference is made to a U.S. Patent Application of Craig R. Conner, Ser. No. 185,239, filed Apr. 18, 1988, for "Flux Profile Control for Startup of an Induction Motor".

Figure 2:
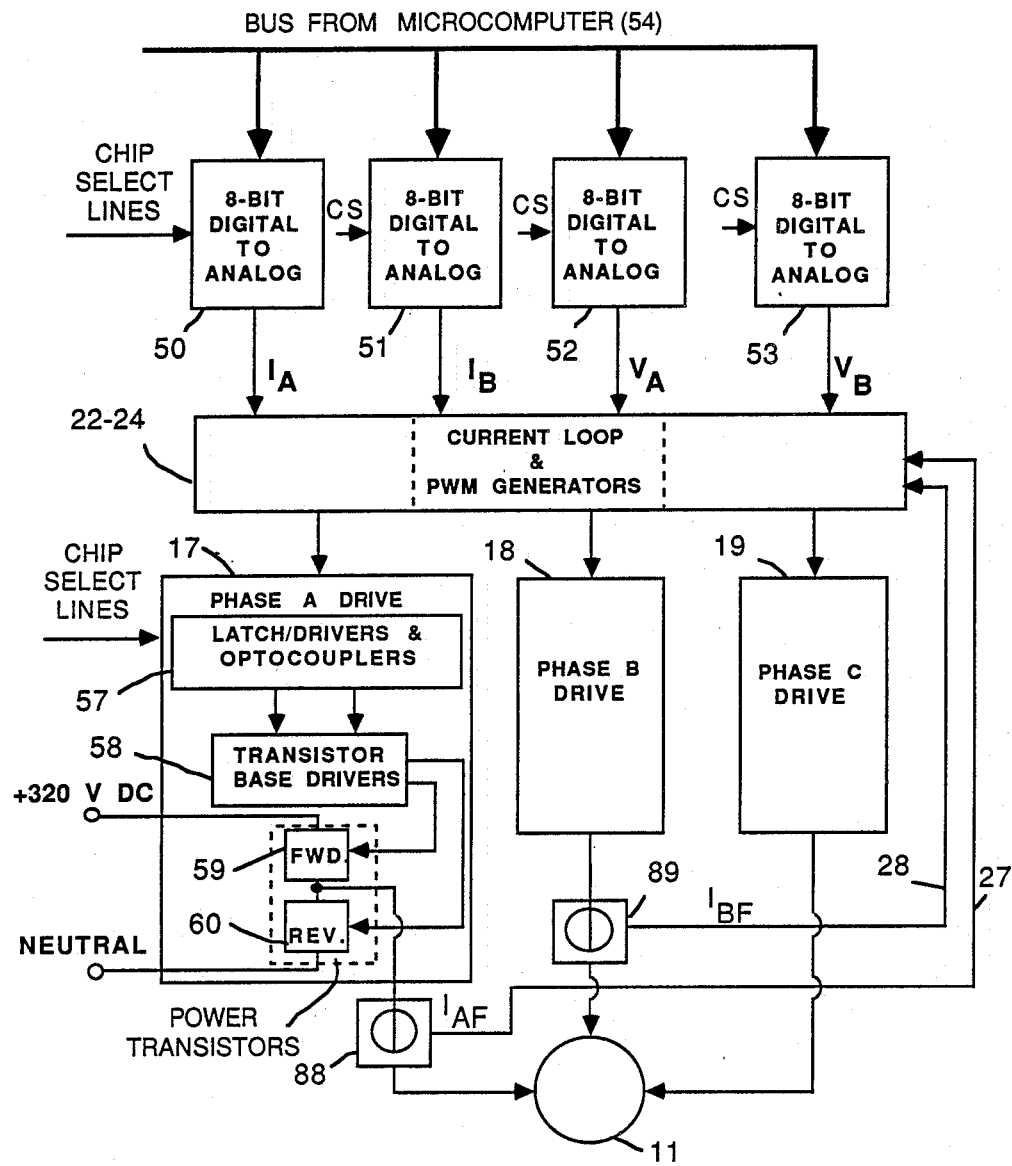

FIG. 2 shows further details of the digital-to-analog converter circuits 50-53 and the Phase A, Phase B and Phase C drive circuits 17-19 of FIG. 1.

The digital-to-analog converter circuitry comprises four multiplying 8-bit digital-to-analog circuits 50-53 which receive bytes of data from the microcomputer 26 through a bus 54 and convert the digital information to analog signals. Commercial circuits suitable for use as the digital-to-analog circuits 50 are AD7528 dual 8-bit buffered monolithic multiplying D-to-A converters manufactured by Analog Devices, Inc., Norwood, Massachusetts. The first digital-to-analog circuit 50 provides the analog signal for the phase A current $I_A$. The second digital-to-analog circuit 51 provides the analog signal for the phase B current $I_B$. The third and fourth digital-to-analog circuits 52 and 53 provide the analog signals for the phase A and phase B voltages, $V_A$ and $V_B$, respectively.

The analog outputs of the digital-to-analog circuits 50-53 are fed to inputs on the current loop and PWM generator circuitry 22-24 in FIGS. 1 and 2. These analog outputs for the phase currents $I_A$ and $I_B$ are variable frequency sine wave signals which are received by the PWM circuitry and which are algebraically summed with respective current feedback signals $I_{AF}$ and $I_{BF}$ provided by current sensors 88 and 89 in the Phase A and Phase B lines going to the motor 11. This provides current error signals and current control loops for the Phases A, B and C as described earlier.

The outputs of the current loop and PWM generators 22-24 are the characteristic sine-triangle modulated PWM pulse trains with pulses of equal magnitude but of varying pulse width. In sine-triangle modulation, a triangular wave is compared with the sine wave current signals to provide crossing points, which are used as a reference for varying the width of the square wave pulses and notches between the pulses which altogether form a pulse train. The resulting pulse width modulated signals are applied to control the Phase A, Phase B and Phase C drive circuits 17-19 to produce a variable magnitude, variable frequency voltage at the terminals of the stator of the motor 11 and to produce a net alternating current in each phase winding (not shown) of the stator.

One of the Phase drive circuits 17 has been shown in greater detail in FIG. 2 and the other two circuits 18 and 19 are identical as to the illustrated circuitry. The drive circuit 17 includes latch/drivers connected to optical couplers as represented by element 57. The latch/drivers receive the PWM signals from the PWM generators 22-24. The latch/drivers are part of a specialized multi-function integrated circuit such as the CD74HCT540 latch/driver circuit available from RCA, Somerville, New Jersey. On the other side of the opto couplers, the pulse width modulated signals are transmitted to transistor base driver circuits 58, which are more particularly hybrid amplifiers that raise the PWM signals to a suitable power level and switch the two power transistors 59 and 60 on and off through their bases.

In this example, the stator or stationery outer portion of the motor 11 has its phase windings connected in a Y-configuration. A 320-volt DC supply voltage is applied across the transistors 59 and 60 so that when one transistor conducts with a transistor in another phase drive circuit 18 or 19, current will flow through two of the phase windings (two legs of the Y). One transistor 59 conducts current in the forward direction through its respective phase winding in the stator portion of the motor 11 and therefore it has been labeled "FWD". The other transistor 60 conducts current flowing in the reverse direction at another time and therefore it has been labeled "REV". The microcomputer 26 activates the power transistors 59,60 for firing with enable signals transmitted through the chip select lines to the Phase A drive circuit 17. The actual switching of the transistors 59,60 on and off is controlled by the PWM signals transmitted to the Phase A drive circuit 17. The microcomputer 26 also controls operation of the Phase B and Phase C drive circuits 18,19 with the same type of signals related in an overall timed firing sequence to the signals for the Phase A drive circuit 17. In carrying out its control functions, the microcomputer 26 calculates a current vector command, which is fed to a current regulation loop to produce a current error signal that further controls the PWM generator. The calculation and output of a current vector command having a magnitude and phase is referred to as "vector" control or "field-oriented" control.

Figure 3:
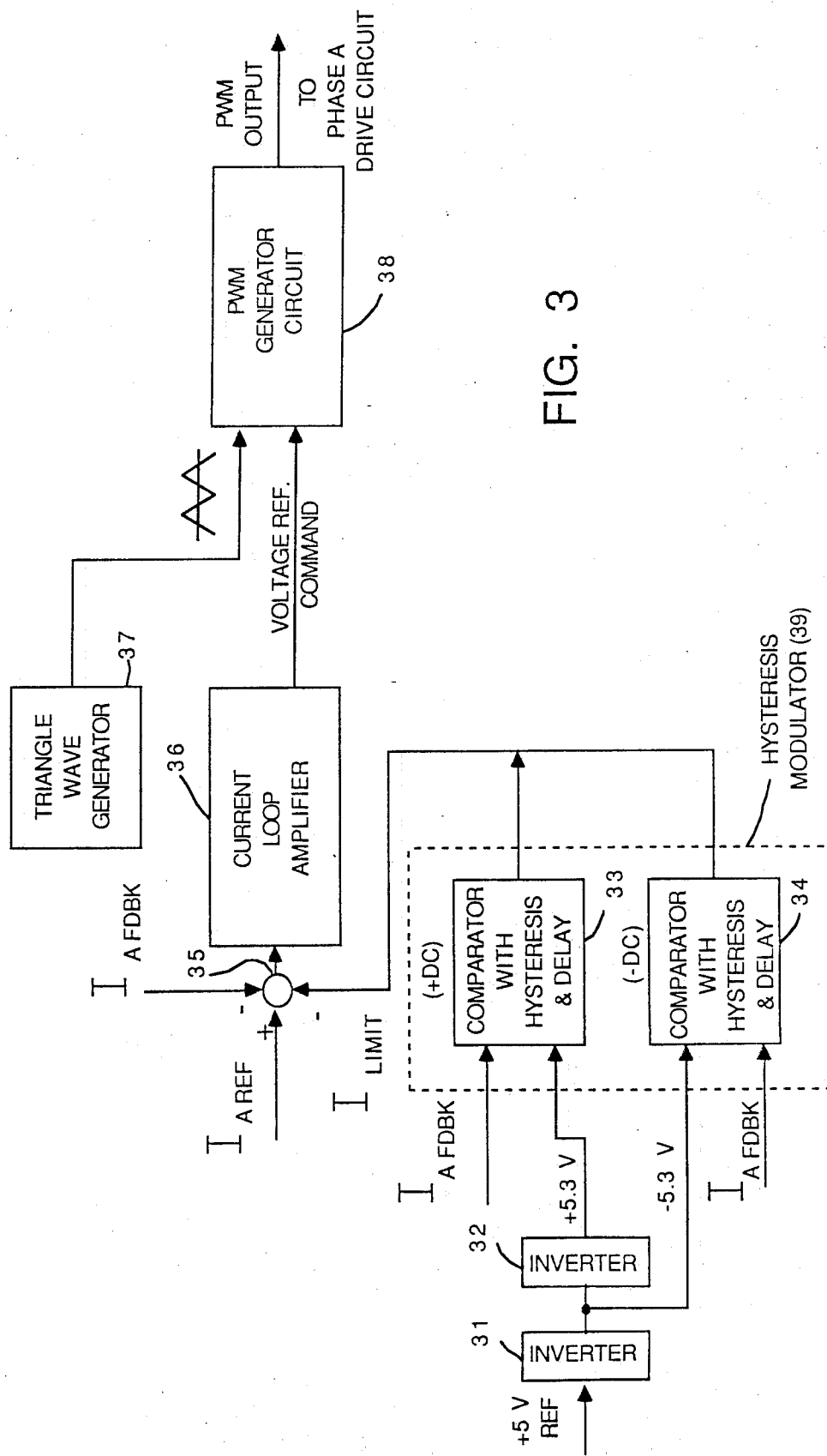
FIG. 3 is a block diagram of a circuit for practicing the invention.
Figure 4:
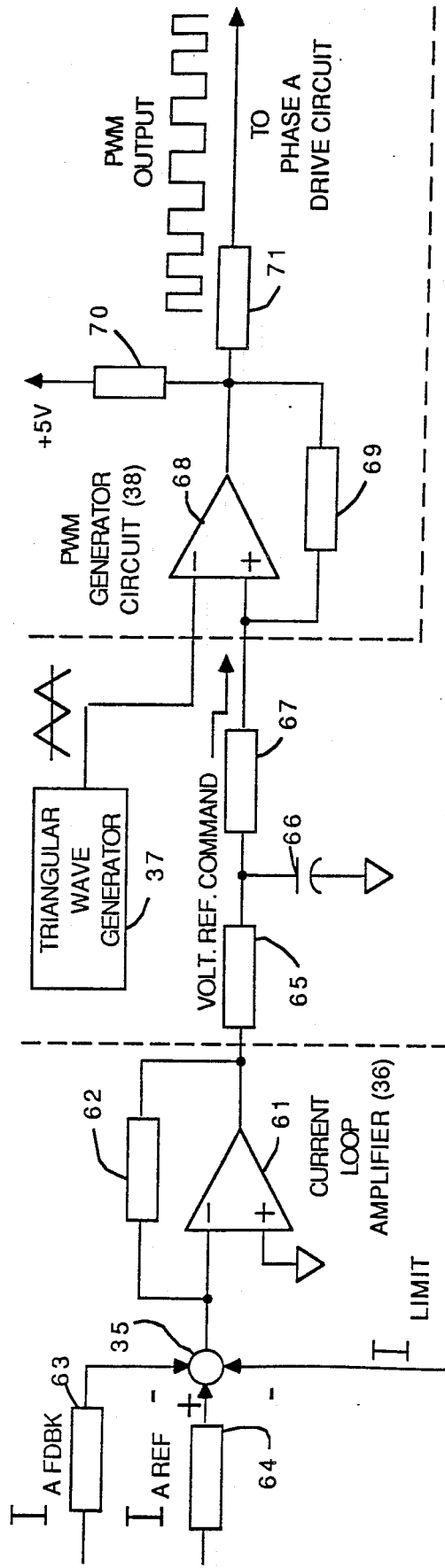
FIG. 4 is a detailed schematic of the circuit of FIG. 3.
Figure 4:
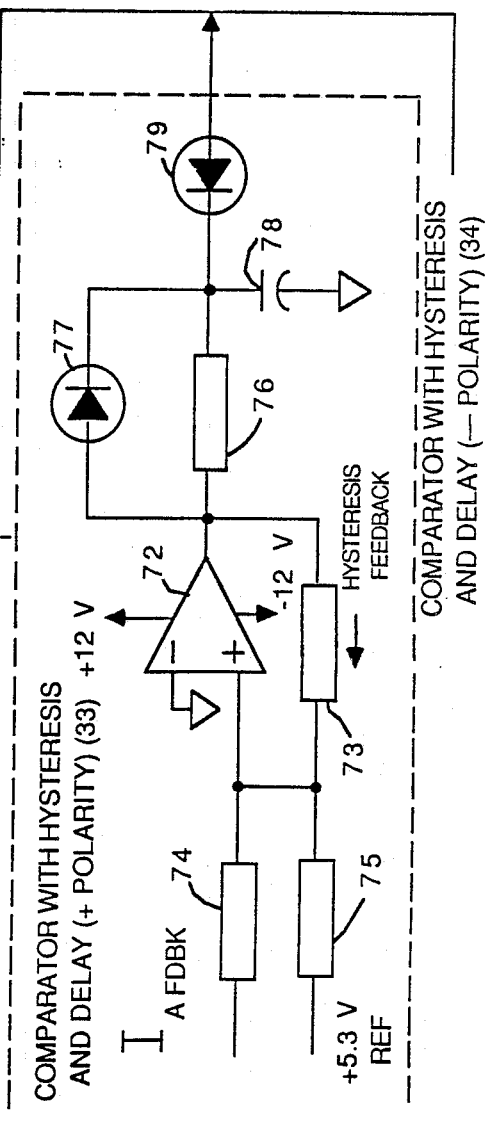

FIGS. 3 and 4 shows the details of the current loop and PWM generator circuit 22 for phase A, and the other two circuits 23 and 24 would be similar except that Phase C would not receive a current feedback signal for current regulation in the sine-triangle mode for the reasons stated earlier in relation to U.S. Pat. No. 4,306,182.

As seen in FIG. 3, a triangle wave generator 37 generates a triangular waveform to one input on a PWM comparator circuit 38. A voltage reference command is received at a second input from the current loop amplifier 36 and is compared with the triangle wave reference to generate the PWM pulse train to Phase A drive circuit 17 in FIGS. 1 and 2. To generate the pulse train, the triangular wave is superimposed on the sine wave voltage signals to provide crossing points, which are used as a reference for varying the width of the square wave pulses and the notches between the square wave pulses in the PWM pulse train.

The details of the PWM generator circuit are seen in FIG. 4. The output is pulled up to +5 DC volts through a pull-up resistor 70 and is connected back to the non-inverting (+) input through resistor 69, which is about 10 times larger in value than the pull-up resistor 70. Another resistor 71 of about the same value as the pull-up resistor 70 is connected in series to the output of the PWM comparator 68. This resistor 71 is in connected to an inverter (not shown) and then to an input on the latch/drivers 57 in the Phase A drive circuit 17. The triangle wave signal is received at the inverting (−) input on the comparator 68, while the voltage reference command signal is received at the non-inverting (+) input.

The voltage reference command is an output from a current loop amplifier circuit 36. As seen in more detailed in FIG. 4, this circuit 36 includes an operational amplifier 61 configured as a summing circuit. In this configuration, resistors 63 and 64 are connected in two parallel branches to a summing input 35, which is a connection to an inverting (−) input on the amplifier 61. The reference command signal ($I_{A\ REF}$) and the current feedback signal ($I_{A\ FDBK}$) are algebraically summed at the summing input 35. Another resistor 62 is connected in a path from the output of the amplifier to the inverting (−) input to provide a feedback current and to control the gain of the circuit 36.

The output of the current loop amplifier circuit 36 is connected to the input of the PWM generator circuit 38 through a T-section with series resistors 65 and 67 and with shunt capacitor 66 which is connected to signal ground as the stem of the "T". The values of the components in this T-section are selected to limit response of the circuitry to high frequency (noisy) components and to provide the proper current levels for connecting the output of the amplifier 62 to the input of comparator 68 in the PWM generator circuit 38.

The current reference command signal($I_{A\ REF}$), which is received at summing input 35 of the current loop amplifier circuit 36, is generated by the microcomputer 26 and then converted to an analog signal by the digital-to-analog converter 50 in FIGS. 1 and 2. When received at the summing input 35 in FIGS. 3 and 4, this signal is an alternating current signal ranging at any instant between +5 volts and −5 volts at a frequency of 0-200 hertz.

The current feedback signal for ($I_{A\ FDBK}$) is received at the summing input 35 from the current sensing device 88 in FIGS. 1 and 2. This signal is also an alternating current signal ranging at any instant between +5 volts and −5 volts. The current feedback signal ($I_{A\ FDBK}$) has the same waveform as this actual motor current, but its magnitude has been scaled down for use in the control electronics.

The actual motor current has a fundamental frequency which is the frequency of the current reference command ($I_{A\ REF}$) from the microcomputer 26, and it includes a PWM ripple current that is generated as a side effect of the PWM technique. As in other PWM systems, the harmonics in the PWM ripple current are multiples of the frequency of the triangle wave generator 37, which is selected to avoid system resonant frequencies or instability of the motor control system.

The current loop amplifier circuit 36 is the summing point in a current regulation loop, where the current feedback signal ($I_{A\ FDBK}$) is algebraically summed with (actually subtracted from) the current reference command signal ($I_{A\ REF}$) and the resulting signal is multiplied by the gain of a current loop amplifier circuit 36 to generate the voltage reference command to the PWM comparator circuit 38.

As part of this invention, a limit current (I $_{LIMIT}$) shown in FIGS. 3 and 4 is provided as an additional input to the summing input 35. This limit current is generated by a hysteresis modulator 39, which is provided by a pair of comparators with hysteresis and delay circuits 33 and 34.

Figure 5:
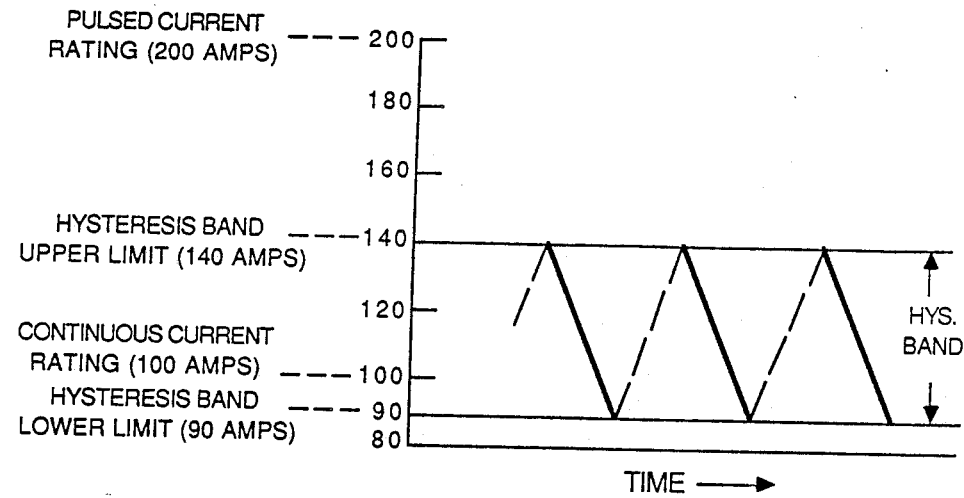
FIG. 5 is a graph of stator current vs. time showing the operation of hysteresis modulation in the present invention.

As shown in FIG. 5, the hysteresis modulator maintains the stator current for each phase within a hysteresis band having an upper limit of 140 amps and a lower limit of 90 amps. The first hysteresis circuit 33 limits current to the hysteresis band upper limit when the sensed current is of positive polarity (+DC MAX) while the second hysteresis circuit 34 limits current to the hysteresis band upper limit when the sensed current is of negative polarity (−DC MAX). Together the two hysteresis circuits 33 and 34 act as an absolute value circuit for sensing when the phase current has reached or exceeded the magnitude of the hysteresis band upper limit.

As seen in FIG. 3, each of the comparator with hysteresis circuits 33 and 34 receives the sensed phase current for phase A ($I_{A\ FDBK}$) as one input. A +5-volt reference signal is fed through a first inverting amplifier 31 to provide a −5.3-volt reference as a second input to the second circuit 34. This signal is fed through a second inverting amplifier 32 to provide +5.3-volt reference as a second input to the first comparator circuit 33. When the sensed current ($I_{A\ FDBK}$) is the opposite in polarity and equals or exceeds the reference in magnitude, one of the comparators is "switched" on to generate the limit current (I $_{LIMIT}$). The outputs of the comparator with hysteresis circuits 33 and 34 are connected in "wired OR" fashion to the summing junction 35, so that whichever comparator is switched "on", its output will be connected to the summing input 35, but the other circuit will remain isolated from the summing input 35.

FIG. 4 shows the details of the comparator with hysteresis circuits 33 and 34. The phase A feedback signal ($I_{A\ FDBK}$) is received through a resistor 74 in one circuit path connecting to the non-inverting (+) input of the comparator 72. The +5.3-volt reference is received through a resistor 75 in a second, parallel circuit path connecting to the non-inverting (+) input of the comparator 72. A third resistor 73 is connected from the output of the comparator 72 to the non-inverting (+) input to provide a hysteresis current feedback path. A comparator with hysteresis switches "on" when the current through resistor 74 becomes greater in magnitude than the reference current through resistor 75. It should be understood that the current through resistor 74 is opposite in polarity to the reference current through resistor 75. Due to hysteresis feedback, the comparator will not switch off until the feedback current not only drops below the reference current, but also drains off the excess feedback current to switch "off" the comparator 72. The comparator 72 operates with an upper switching threshold and a lower switching threshold which are controlled by the scaling and summing of two signals at its non-inverting (+) input, the reference signal through resistor 75 and the hysteresis feedback signal through resistor 73. When the comparator is switched "on", the switching threshold changes —in this case—to a reference corresponding to 90 amps of motor current.

Also seen in FIG. 4 is a diode 77 with its anode connected to the output of the comparator 72 in parallel with a resistor 76 connected to the output of the comparator 72. On the other side of the resistor 76 and diode 77, a capacitor 78 is connected from the junction of resistor 76 and diode 77 to a signal ground. When the comparator is first switched on, this capacitor 78 will charge over some time period to delay the effect of the output of the comparator 72. This delay is introduced so that an instantaneous overcurrent protection circuit (not shown) in another part of the drive will be allowed to operate in response to large transients prior to invoking the more moderate current limiting action of the comparator circuits 33 and 34.

Each comparator circuit 33, 34, is also connected to the summing junction 35 through a diode, such as 79, which allows the two comparator circuits for the each phase to be connected in parallel or "wired-OR" fashion to the summing junction 35. The diode will isolate the comparator circuit 33 from signals from other circuit 34 when that circuit 34 is switched on.

Still referring to FIG. 4, the comparator 72 in circuit 33 is switched "on" by a negative signal received through resistor 74 which is greater than the positive reference signal received through resistor 75. This generates an output signal of negative polarity from the comparator 72. The diode 79 will pass a negative signal and block a positive signal, so the signal will be passed as a limit current signal (I $_{LIMIT}$). Before the limit current signal is passed however, capacitor 78 will build up a certain amount of negative charge. When the comparator is switched off, the diode 77 will conduct a negative current as the capacitor 78 discharges.

The power supply voltages provided to the comparator 72 are +12 DC volts and −12 DC volts, whereas for the other circuitry in FIG. 4, the power supply voltages are +5 DC volts and −5 DC volts. The components in the comparator circuits 33 and 34 are selected so that when a comparator is switched on it will generate a limit current (I $_{LIMIT}$) of 12 milliamps. On the other hand, components are selected to generate signals I$_{A\ REF}$ and I$_{A\ FDBK}$ which are on the order of 1 milliamp.

When the limit current (I $_{LIMIT}$) is generated by either one of the comparators 33 or 34, the output from the hysteresis modulator 39 is so great that it controls the input to the current loop amplifier 36 and masks out the normal inputs provided by the current reference command signal (I$_{A\ REF}$) and the phase A feedback signal (I$_{A\ FDBK}$)

In the present example, the current sensing devices 88 and 89 calibrated so that a current magnitude of 140 amps will generate a slightly greater than 5.3-volt signal to switch one of the comparator circuits 33 or 34 to the "on" state.

The current sensing device 88, 89 in FIGS. 1 and 2 incorporate Hall effect devices for generating a current proportional to the effective current conducted from the power semiconductors 59, 60 to the Phase A winding of the motor 11, for example. The current sensing devices allow for connection of a scaling or burden resistor (not shown). The value of this burden resistor is selected so that a current magnitude of 140 amps will generate a signal with a magnitude slightly greater than 5.3 volts to switch one of the comparator circuits 33 or 34.

When the phase A feedback signal exceeds the reference signal to indicate that a current limit such as 140 amps (controlled at +input) has been reached or exceeded, one of the comparator circuits 33, 34 is switched to generate a limit current signal to the input of the current loop amplifier. If the limit current signal (I $_{LIMIT}$) is generated from circuit 33 it will have a negative polarity; if it is generated from circuit 34, it will have a positive polarity. When the comparator circuit 33 is switched, the hysteresis feedback signal within the circuit changes the switching threshold at the (+) input of comparator 72 to a level corresponding to +90 amps of motor phase current. When the motor phase current returns to a level below +90 amps, the comparator circuit 33 switches again to remove the limit current signal (I $_{LIMIT}$) and allow normal operation of the current loop amplifier 36 and PWM generator 38.

Referring to FIG. 5, the upper limit of the hysteresis band is set at 140 amps to be comfortably between the continuous current rating of 100 amps for the power semiconductor switches in the Phase A-C drive circuits 17-19 and the pulsed current rating of 200 amps for these same semiconductor devices. The lower limit of the hysteresis band is selected as 90 amps because it corresponds to a desired switching frequency that is not greater than the frequency of the triangle wave generator.

With the above-described circuitry, the current loop and PWM generator circuits 22-24 show improved response to transient operating conditions such as when the contactor 20 is closed to connect the drive to a motor that is already rotating. As seen in FIG. 5, the motor is operating in the sine-triangle mode during the time that current is increasing toward the 140-amp limit (dashed lines in FIG. 5). Hysteresis modulation and current limiting goes into effect when motor current reaches 140 amps per phase, and providing the overcurrent is not so large as to cause operation of an instantaneous overcurrent protection circuit (not illustrated) in another part of the drive. That circuit is set for some value of overcurrent such as 300% of the continuous current rating, which would occur under fault conditions. Hysteresis modulation is in effect as the motor current decreases to a value substantially less than the maximum current rating (100 amps) for continuous operation (solid lines in FIG. 5). At this value, 90 amps, sine-triangle PWM modulation is restored. Generally, the motor is operated near or below the continuous current rating for the semiconductor switches, and sine-triangle PWM modulation is the normal steady-state mode of operation for the motor drive.

This completes a description of one example of the invention. Of course, those skilled in the art will understand that many of the details provided herein may be modified while still carrying out the invention, and therefore, to apprise the public of the scope of the invention, the following claims are made.

I claim:

1. A method of limiting a phase current that is supplied to an electrical motor as a result of pulse signals being generated by a pulse width modulating (PWM) generator to control power semiconductors in a DC-to-AC inverter, the method comprising:
    sensing the phase current being drawn by the electrical motor;
    generating a time-varying phase voltage reference to the PWM generator in response to a difference between the sensed phase current and a time-varying phase current command;
    generating a phase voltage command as an output of the PWM generator in response to comparing two inputs to the PWM generator, wherein a first input is the time-varying phase voltage reference and wherein the second input is a triangular wave reference;
    generating a limit current in response to a magnitude of the sensed phase current reaching a hysteresis band limit; and
    algebraically summing the limit current, the sensed phase current and the time-varying phase current command to control the time-varying phase voltage reference to the PWM generator and to limit the phase voltage command from the output of the PWM generator in response to the magnitude of the sensed phase current reaching the hysteresis band limit.

2. The method of claim 1, wherein the hysteresis band limit is selected in a range between the continuous current rating and the pulsed current rating for the power semiconductors in the DC-to-AC inverter.

3. The method of claim 1, further comprising the step of delaying the generation of the limit current for a time delay sufficient to allow operation of other overcurrent protection circuitry.

4. The method of claim 1, wherein the limit current is generated when the sensed phase current has a positive polarity.

5. The method of claim 1, wherein the the limit current is generated when the sensed phase current has a negative polarity.

6. A circuit for limiting a magnitude of a phase current that is supplied to an electrical motor in response to a phase voltage applied from power semiconductors in a DC-to-AC inverter, the circuit operating in response to a time-varying phase current command and in response to the sensing of a phase current being drawn by the electrical motor and the circuit comprising:
- a pulse width modulating (PWM) generator for generating a phase voltage command to control the operation of the power semiconductors in the DC-to-AC inverter;
- current regulation means responsive to a difference between the time-varying phase current command and a sensed phase current for generating a time-varying phase voltage reference to the PWM generator;
- means operatively connected to the PWM generator for generating a triangular wave reference to the PWM generator;
- wherein the PWM generator generates the phase voltage command as an output in response to comparing first and second inputs to the PWM generator, wherein the first input is the time-varying phase voltage reference from the current regulation means and wherein the second input is the triangular wave reference; and
- hysteresis modulation means operatively connected in series with the current regulation means and responsive to the sensed phase current reaching a hysteresis band upper limit for generating a limit current to the current regulation means that further generates a phase voltage reference from the current regulation means to the PWM generator, wherein the phase voltage command from the output of the PWM generator is controlled in response to the magnitude of the sensed phase current and is rendered non-responsive to the triangular wave reference.

7. The circuit of claim 6, wherein the hysteresis modulation means is later responsive to the magnitude of the sensed phase current decreasing to a hysteresis band lower limit to reduce the limit current to the current regulation means to allow re-establishment of sine-triangle modulation in the PWM generator.

8. The circuit of claim 6, the current regulation means includes means for algebraically summing the time-varying phase current command, the sensed phase current and the limit current.

9. The circuit of claim 8, wherein the means for algebraically summing is a summing circuit with a summing input for receiving the time-varying phase current command, the sensed phase current and the limit current.

10. The circuit of claim 6, wherein the hysteresis modulation means includes absolute value means for generating the limit current in response to a limit current reference representing the hysteresis band upper limit and in response to a magnitude of the sensed phase current reaching the hysteresis band upper limit, irrespective of polarity of the sensed phase current.

11. The circuit of claim 10, wherein the absolute value means comprises:
- a first comparator circuit for generating the limit current in response to a sensed phase current of positive polarity and of a magnitude reaching a hysteresis band upper limit; and
- a second comparator circuit for generating the limit current in response to a sensed phase current of negative polarity and of a magnitude reaching a hysteresis band upper limit.

12. The circuit of claim 11, wherein the first and second comparator circuits each include delay means to delay the generation of the limit current for a preselected interval to allow operation of other overcurrent protection circuitry.

* * * * *